United States Patent Office 2,775,609
Patented Dec. 25, 1956

2,775,609
PREPARATION OF CYANO ORGANICSULFONYL CHLORIDES

Frederick Comte, Kirkwood, Mo., assignor to Monsanto Chemical Company, St. Louis, Mo., a corporation of Delaware No Drawing. Application July 8, 1954,
Serial No. 442,211

6 Claims. (Cl. 260—465)

This invention relates to the preparation of cyano organicsulfonyl chlorides and more particularly pertains to an improved process for preparing cyano organicsulfonyl chloride from trichlorophosphazo organic acyl chlorides.

Because of the presence of two exceedingly reactive groups in cyano organicsulfonyl chlorides $NC-A-SO_2Cl$ wherein A is a divalent organic group; these compounds are exceptionally useful as intermediates in the synthesis of other organic chemical compounds. For example, cyano organicsulfonyl chlorides such as p-cyanobenzenesulfonyl chloride can be used as an intermediate in the preparation of alkyl substituted sulfamyl derivatives of organic acids such as p-(di-n-propylsulfamyl) benzoic acid by reacting a primary or secondary amine with the cyano organicsulfonyl chloride in an alkaline medium, for example in the presence of sodium hydroxide, and acidifying the resulting product. The cyano group can be reduced to form a primary methyl amino group, or it can be reacted with an alcohol to form an imido ester group, or it can be oxidized to an isocyano group which reacts with alcohols to form urethanes or with ammonia or amines to form ureas, or the cyano group can be utilized in any other of the nitrile reactions. Likewise the sulfonyl chloride group can be utilized in the preparation of an unsubstituted sulfonamide group as well as mono- and di-substituted sulfonamide groups, or in the preparation of esters by the reaction of the sulfonyl chloride group with an alcohol or in the preparation of numerous other groups by utilizing the reactivity of the sulfonyl chloride group.

In general, the process of this invention is an improved process for preparing cyano organicsulfonyl chlorides from trichlorophosphazo organic acyl chlorides. The conversion of a trichlorophosphazosulfonyl organic acyl chloride to a cyano organicsulfonyl chloride takes place according to the following reaction,

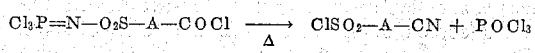

wherein A is a divalent organic group. The precise reaction mechanics of the above conversion reaction has not been definitely established. Considerable evidence has been presented to indicate that the conversion involves an intermolecular reaction although the possibility of an intramolecular rearrangement or reaction has not been positively overruled. However, the process of this invention is not dependent upon the precise mechanics of the conversion of the trichlorophosphazo acyl chloride.

One method suggested for the conversion of a trichlorophosphazosulfonyl organic acyl chloride to a cyano organicsulfonyl chloride is to merely heat the dry solid precursor to a temperature of at least 200° C. Another method suggested for this conversion is to heat a solution of the precursor, a trichlorophosphazosulfonyl organic acyl chloride in dry carbon tetrachloride to a temperature of 200° C. or above. The latter process would of course have to be carried out under pressure. Both of these methods suggested for achieving the desired conversion reported substantially quantitative yields of the cyanoaromatic sulfonyl chloride. However, it has been found that quantities greater than about 0.1 gram mole of the trichlorophosphazosulfonyl organic acyl chloride heated according to either of the suggested methods give very erratic results. For example the conversion will begin at 150° C. one time, 190° C. at another time and at a temperature of above 200° C. at still another time. Because of the erratic nature of the conversion reaction and because the conversion reaction is exothermic, the reaction temperature is difficult to maintain during conversion and excessively high final temperatures are involved causing the cyano organicsulfonyl chloride to decompose to a cyano organic chloride through the destruction of the sulfonyl chloride group and the splitting out of $SO_2$. Obviously large scale production of a cyano organicsulfonyl chloride cannot be successfully achieved by either of the suggested methods for accomplishing the conversion at any known or predictable temperature.

It is an object of this invention to provide an efficient process for converting a trichlorophosphazosulfonyl organic acyl chloride to a cyano organicsulfonyl chloride at a predeterminable and certain temperature. It is also an object of this invention to provide a conversion process which will be reproducible at any desired temperature. Other objects of this invention will be obvious from the description hereinafter appearing.

It has been discovered that the conversion of trichlorophosphazosulfonyl organic acyl chlorides having the formula $$Cl_3P=N-O_2S-A-COCl$$

wherein A is a divalent organic group, to the corresponding cyano sulfonyl chloride can be accomplished by heating said trichlorophosphazosulfonyl acyl chloride in the presence of an aromatic sulfonamide as a conversion moderator. The reaction can be carried out in the presence of an inert reaction diluent which may be a solvent for either the starting material, the moderator or the end product or a mutual solvent for all three. However, the diluent need not be a solvent for any of the chemical compounds present.

Moderators which are useful according to this invention are the aromatic sulfonamide having the formula  wherein Ar is an aromatic group. The preferred sulfonamides are the aryl sulfonamide, that is, Ar is an aromatic hydrocarbon group, containing 6 to 12 carbon atoms in the aryl group. Specific members of the preferred class of moderators include benzenesulfonamide, the toluenesulfonamides, the xylenesulfonamides, the tri- and tetramethylbenzenesulfonamides, the ethylbenzenesulfonamides, the propylbenzenesulfonamides, the butylbenzenesulfonamides, biphenyl mono- and disulfonamides and naphthalenesulfonamides among others. Included in the broad class of aromatic sulfonamides are such compounds as p-nitrobenzenesulfonamide, sulfanilamide, 5-benzimidazolesulfonamide, p-sulfamylphenol, p-methoxybenzenesulfonamide, p-benzoxysulfonamide, p-sulfamyl methylbenzoate, p-sulfamylbenzamide, p-sulfamylacetophenone, chlorobenzenesulfonamides, and other analogous aromatic sulfonamides.

In general the process of this invention is carried out by heating the trichlorophosphazosulfonyl organic acyl chloride to the desired conversion temperature, under 200° C., and then adding the moderator in an amount of from 2 to 10 parts by weight per 100 parts by weight of the trichlorophosphazosulfonyl organic acyl chloride. By following the process of this invention, temperatures of 200° C. or above are not involved and consequently the formation of cyano organic chlorides by splitting out of $SO_2$ does not take place, and the resulting formation of undesirable by-products such as cyano organic chloride and tarry materials by side reactions are substantially eliminated. In the preferred process of this invention usually the use of such quantities as from about 2 to 10 parts by weight of the moderator per 100 parts by weight of the trichlorophosphazo compound will give satisfactory results at temperatures of from 150° to 190° C. More specifically, the trichlorophosphazosulfonyl organic acyl chloride is heated in the presence of an aromatic sulfonamide at a predetermined temperature as low as 150° C. and as high as 190° C. and there can be recovered from the resulting product a substantially pure cyano organic-sulfonyl chloride. Further, according to the process of this invention the phosphoryl chloride split out during the conversion is removed preferably as rapidly as formed, under reduced pressure of from 75 to 200 mm. Hg absolute. However, substantially equivalent results can be obtained at higher pressures, that is, from 200 mm. Hg absolute to atmospheric pressure, but of course in a longer time. The process of this invention will be described an illustrated in greater detail in the specific examples hereinafter appearing.

Trichlorophosphazosulfonyl organic acyl chlorides which can be converted to cyanoorganic chlorides according to this invention are those having the formula,

Cl$_3$P=N—O$_2$S—A—COCl wherein A is a divalent organic group. The divalent group A can be aliphatic or aromatic groups including alkyl, alicyclic including groups derived from naphthenes, alkyl, alkaryl and aralkyl hydrocarbon groups as well as such groups containing non-hydrocarbon substituents such as halogens, ether and thioether substituents such as alkoxy, aryloxy, alkylthio and arylthio, nitro, amino, among others. Such groups as the hydroxy, carboxy, amino, monosubstituted amino and other reactive groups can also be present, however, such reactive groups are generally displaced during the preparation of the trichlorophosphazosulfonyl organic acyl chloride which is accomplished by reacting a sulfonyl organic carboxylic acid with phosphorous pentachloride. Although the above formula indicates the presence of only one trichlorophosphazosulfonyl group, Cl$_3$P=N—O$_2$S, and one acyl chloride group, the process of this invention is not limited solely thereto for compounds containing more than one of either of these groups can be employed in the process of this invention.

Typical trichlorophosphazosulfonyl organic acyl chloride reactants which can be employed in the process of this invention include among others trichlorophosphazosulfonyl acetyl chloride, 3-trichlorophosphazosulfonyl propionylchloride, trichlorophosphazosulfonyl stearyl chloride, trichlorophosphazosulfonyl cyclopentane acyl chloride, p-(trichlorophosphazosulfonyl) cyclohexane acyl chloride, p-(trichlorophosphazosulfonyl) benzoyl chloride, 7-trichlorophosphazosulfonyl-3-phenanthrene acyl chloride, 4-trichlorophosphazosulfonyl-1-naphthoyl-chloride, 5-trichlorophosphazosulfonyl-1-naphthoxychloride, trichlorophosphazosulfonyl-nicotinylchloride, di-(trichlorophosphazosulfonyl) phthalylchlorides, 4,5-di(trichlorophosphazosulfonyl)-1,8 naphthalylchloride, trichlorophosphazosulfonyl cyclohexyl acetyl chloride, β-(p-trichlorophosphazosulfonylbenzoyl) propionyl chloride, trichlorophosphazosulfonyl nitrobenzoyl chloride, trichlorophosphazosulfonylchlorobenzoyl chloride, trichlorophosphazosulfonylchlorocyclohexane acetyl chloride, and 5-(trichlorophosphazosulfonyl)-2-furyl chloride.

The following examples are illustrative of the process of this invention. In these examples all parts are by weight.

*Example I*

There is heated 429 parts of a mixture containing 263 parts p-trichlorophosphazosulfonyl benzoyl chloride and 166 parts of phosphoryl chloride in suitable distillation equipment at about 60–65° C. and a reduced pressure of 200 mm. Hg until about 90% of the phosphoryl chloride has been distilled off. Thereafter the temperature is increased to 190° C. whereupon 10 parts of p-toluene-sulfonamide are added and POCl$_3$ is formed at an increased rate indicating that the rearrangement reaction has begun. Again the POCl$_3$ is distilled off as rapidly as formed by retaining the reaction medium at 200 mm. Hg and 190° C. for about 3 hours, and there reducing the pressure to 100 mm. Hg and there held for about one hour. The residual material is cooled to 50° C. and 156 parts of toluene is added thereto. The resulting mixture is heated to 70° C., filtered and the filter cake is washed with 56 parts of hot toluene (65° C.). There is recovered 337 parts of toluene solution of which 212 parts are toluene and 125 parts are p-cyanobenzenesulfonyl chloride.

*Example II*

The process of Example I is repeated except that 8 parts of benzenesulfonamide are added in place of p-toluenesulfonamide when the distillation temperature had reached 170° C. at 200 mm. Hg absolute. Substantially the same yield of p-cyanobenzenesulfonyl chloride is obtained.

*Example III*

The process of Example I is repeated except that 12 parts of p-toluenesulfonamide acid are added when the distillation temperature had reached 180° C. at 200 mm. Hg absolute. Substantially the same yield of p-cyanobenzenesulfonyl is obtained.

*Example IV*

The process of Example I is repeated except that p-toluenesulfonamide is added when the distillation temperature had reached 150° C. at 100 mm. Hg absolute. An excellent yield of p-cyanobenzenesulfonyl chloride is obtained.

*Example V*

To prepare 2-cyano-5-furansulfonyl chloride, one mole of 5-(thrichlorophosphazosulfonyl)-2-furyl chloride in 503 parts of phosphoryl chloride obtained by the reaction of about 2.5 moles of PCl$_5$ with one mole of 2-sulfamyl-5-furoic acid in the presence of 350 parts of POCl$_3$ is heated in suitable distillation equipment at 200 mm. Hg until about 450 parts of POCl$_3$ is distilled off between a temperature of 75° C. and 160° C. While maintaining a temperature of about 160° C. and 200 mm. Hg pressure, 10 parts of benzene sulfonamide are added to the hot material in the still pot. Thereafter the rate of distillation of phosphoryl chloride increases indicating that the rearrangement reaction is taking place splitting out POCl$_3$. When the distillation of POCl$_3$ apparently stops, the pressure in the distillation equipment is reduced to about 100 mm. Hg absolute for about an hour and no heat is supplied to the still pot. The residue in the still pot is cooled to about 50° C. and then dissolved in toluene and the resulting solution filtered. 2-cyano-5-furansulfonyl chloride can be recovered by distilling off the toluene at reduced pressure.

2-cyano-5-furansulfonyl chloride

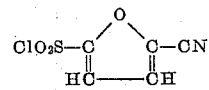

can be converted to 5-(di-n-propyl) sulfamyl-2-furoic acid, a compound similar to Benemid, by reaction with di-n-propylamine in the presence of sodium hydroxide followed by acidification with hydrochloric or sulfuric acid.

*Example VI*

1,8-dicyano-naphthalene-4,5-disulfonylchloride is prepared by heating 0.25 mole of 4,5-di(trichlorophosphazosulfonyl)-1,8-naphthalyl dichloride obtained from the reaction of 0.25 mole, 4,5-disulfamyl-1,8-naphthoic acid and 1.25 moles of $PCl_5$ in $POCl_3$ after removing the free $POCl_3$ to about 175° C. at 200 mm. Hg absolute and adding thereto about 15 parts of α-naphthalene-sulfonamide and removing the $POCl_3$ split out as rapidly as formed. When $POCl_3$ is no longer evolved, the residue is held at about 90 mm. Hg abosolute until its temperature is about 50° C., dissolved in toluene and filtered. The desired product can be obtained from the toluene solution by the recovery of the toluene at reduced pressure.

*Example VII* p-Cyanocyclohexanesulfonyl chloride is obtained from p-trichlorophosphazosulfonylcyclohexyl acyl chloride prepared by reacting $PCl_5$ with p-sulfamylcyclohexane carboxylic acid by heating at 160° C. at about 180 mm. Hg absolute and, while maintained at these conditions; adding thereto about 6 parts of benzene-sulfonamide per 100 parts of trichlorophosphazosulfonylcyclohexyl acyl chloride. The $POCl_3$ evolved is distilled off substantially as rapidly as formed. When $POCl_3$ is no longer evolved, the pressure is further reduced to about 85 mm. Hg and there maintained until the residual material is cooled to about 50° C. The residue is dissolved in hot toluene, filtered and the toluene removed at reduced pressure. The residue is the desired product.

*Example VIII*

4-trichlorophosphazosulfonyl-2-nitrobenzoyl chloride, obtained by reacting 4-sulfamyl-2-nitrobenzoic acid with $PCl_5$ is heated to 150° C. at about 190 mm. Hg absolute with the addition thereto of about 3% by weight p-nitrobenzenesulfonamide while removing the $POCl_3$ formed as rapidly as possible. When $POCl_3$ is no longer evolved, the resulting residue is held at a pressure of about 100 mm. Hg absolute without heating until the temperature of the residue reaches 50° C. This residue is dissolved in toluene at about 75° C. and the hot solution filtered. The product, 4-cyano-2-nitrobenzenesulfonyl chloride, can be obtained by heating the solution under reduced pressure to recover the toluene.

What is claimed is:

1. In the preparation of a cyano organicsulfonyl chloride by heating a trichlorophosphazosulfonyl organic acyl chloride, the step comprising heating said trichlorophosphazosulfonyl organic acyl chloride at a temperature of from 150° to 190° C. in the presence of an aromatic sulfonamide as a reaction moderator and removing the $POCl_3$ as rapidly as formed.

2. The process of claim 1 wherein the $POCl_3$ is removed at reduced pressure of from 75 to 200 mm. Hg absolute.

3. The process of claim 1 wherein the $POCl_3$ is removed at reduced pressure of from 75 to 200 mm. Hg absolute and the reaction moderator is an aryl sulfonamide.

4. In the preparation of p-cyanobenzenesulfonyl chloride by heating p-trichlorophosphazosulfonyl benzoyl chloride and splitting out $POCl_3$, the step comprising heating p-trichlorophosphazosulfonyl benzoyl chloride in the presence of from about 2 parts to about 10 parts by weight of an arylsulfonamide as a reaction moderator per 100 parts by weight of p-trichlorophosphazosulfonyl benzoyl chloride at a temperature of from 150° to 190° C. and a pressure of from 75 to 200 mm. Hg absolute while removing $POCl_3$ as rapidly as evolved.

5. The process of claim 4 wherein the reaction moderator is benzenesulfonamide.

6. The process of claim 4 wherein the reaction moderator is p-toluenesulfonamide.

References Cited in the file of this patent

Kirsanov, Chem. Abstracts, vol. 46, col. 1135 (1952).